June 11, 1946.     G. E. FLINN     2,402,033
PISTON RING SEAL
Filed March 21, 1944
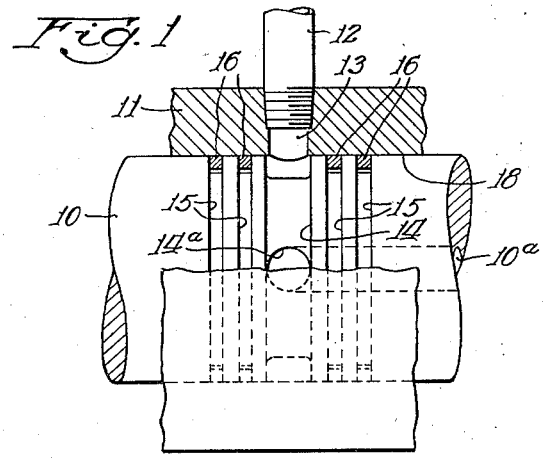
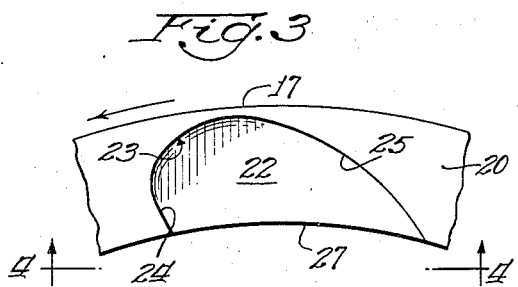
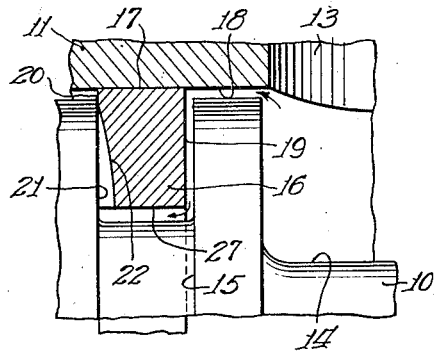
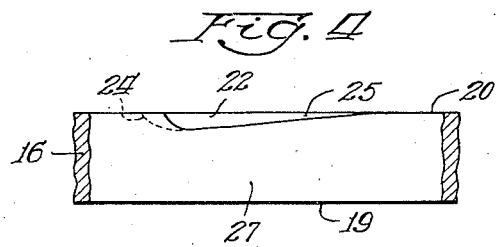
Inventor:
George E. Flinn
By: Edward C. Fitzbaugh
Atty.

Patented June 11, 1946

2,402,033

UNITED STATES PATENT OFFICE 2,402,033

PISTON RING SEAL

George E. Flinn, Muncie, Ind., assignor to Borg-Warner Corporation, Chicago, Ill., a corporation of Illinois Application March 21, 1944, Serial No. 527,441

7 Claims. (Cl. 285—96.3)

The present invention relates to a lubricated seal for two members that are adapted for relative movement with respect to each other. The invention has particular reference to sealing means for a rotatable transmission shaft wherein the shaft has a passageway for conducting pressure fluid to a coupling device, the passageway communicating with a valve block in the transmission housing.

Heretofore, the sealing of pressure fluid for movable shafts has been effected by the use of means such as spring rings that are set into annular grooves or channels in the surfaces of the shafts, and such rings have proven more or less effective when the oil is under a comparatively low pressure. It has been found however that the rings are entirely inefficient when the oil is under the extremely high pressure demanded in supplying oil under pressure to transmission shafts or other rotating mechanisms which also serve to conduct the oil to a clutch or other coupling device to maintain the device in operative condition. This inefficiency is due to the fact that the sealing rings are forced outwardly and longitudinally of the shaft by the high pressure of the lubricant with such force that the rings are pressed against the surfaces of the adjacent parts of the assembly and the excessive friction which is created thereby will wear away the engaged critical surfaces of the rings during a very short period of operation. The excessive friction and the wear on the engaged surfaces is due to the lack of lubrication of these critical surfaces because the pressure exerted by the oil against the ring reduces the clearance almost to zero and thus causes the lubricant to be squeezed out from between the engaged surfaces. The present invention has solved this problem and has overcome the above-mentioned inherent objection to the prior practice by providing means whereby the intimately contacted surfaces in question are supplied with lubrication at all times regardless of whether the oil is under normal or extremely high pressure without seriously reducing the pressure in the system and without requiring an excessive pumping capacity.

It is one of the principal objects of this improvement to simplify the construction of a seal such as contemplated herein, and to improve the efficiency, operation and dependability of such seal.

Another principal object of the invention resides in providing a sealing assembly that comprises a specially constructed ring to effect a seal between two members that are adapted for relative movement the one with respect to the other.

A further object hereof is to provide a sealing ring that is characterized by means for definitely supplying lubricant to its critical surfaces thereby to reduce friction therebetween to a minimum and to increase the life of the sealing ring.

Still another object hereof resides in providing a rotatable shaft with a seal that is adapted to prevent escape of lubricant especially when such lubricant is supplied to the shaft under extremely high pressure. Furthermore, it is the aim of this invention to provide an improved seal ring that is of novel construction.

Additional objects, aims, and advantages of the invention contemplated herein will be apparent to persons skilled in the art after the construction and operation of the lubricant seal and ring is understood from the within description.

It is preferred to accomplish the numerous objects of this invention and to practice the same in substantially the manner hereinafter fully described and as more particularly pointed out in the appended claims, reference being herein made to the accompanying drawing that forms a part of this specification, wherein:

Fig. 1 is a view partly in elevation and partly in longitudinal axial section of a fragment of a transmission shaft showing the instrumentalities of the present lubricant seal incorporated thereon;

Fig. 2 is an enlarged fragmentary section of a portion of the structure shown in Fig. 1, drawn to an exaggerated scale;

Fig. 3 is a side elevation of a segment of a seal ring such as contemplated herein, the view being on an enlarged scale; and Fig. 4 is a view on line 4—4 on Fig. 3 and looking in the direction of the arrows.

The drawing is to be understood as being more or less of a schematic character for the purpose of disclosing a typical or preferred form of the improvements contemplated herein, and in the drawing like reference characters identify the same parts in the several views.

In the exemplification of the invention disclosed herein, two members 10 and 11 that are adapted for relative movement with respect to each other are illustrated. The member 10 typifies a rotatable shaft, and the member 11 typifies a stationary bearing sleeve, collector ring, or the like in which the shaft is mounted for rotary movement. The pressure lubricant from any suitable source is fed into the interior of the sleeve 11 through a pipe 12 screwed into a threaded inlet port 13 extending transversely through the wall of the sleeve.

Adjacent the inlet opening 13 and in communication therewith, the shaft is provided with an annular channel or groove 14 in its exterior surface to receive the lubricant discharged thereinto from the inlet port 13 with a radial bore 14a connecting the groove with an axial bore 10a in communication with a brake, clutch or other pressure actuated members of a transmission assembly (not shown). Obviously the source of the fluid under pressure may be in direct communication with axial bore 10a and the device to be operated may be in communication with pipe 12, i. e., the direction of flow may be reversed. The shaft is provided upon each side of this channel 14 with annular grooves 15, for the sealing members. There are preferably two of these grooves 15 upon each side of the central or intermediate channel although in systems using lower pressures one groove on each side may suffice. These annular grooves 15 are shown to have a rectangular cross-sectional shape, but it will be understood that they may have other angular cross-section or they may be arcuate, depending upon the shape of the particular sealing members that are seated therein.

In Figs. 3 and 4 are shown views of the improved sealing member contemplated herein, the member comprising a split spring ring 16 of rectangular cross section that is of such transverse dimensions that there are slight clearances between the surfaces of the ring and the proximate surfaces of the groove 15 into which the ring is snapped in the manner of a piston ring. This ring 16 is disposed in its seat so that its outer circumferential surface 17 contacts the inner surface 18 of the bore of the sleeve or bearing 11 in the manner illustrated in Fig. 2. When the pressure of the lubricant is exerted against the side face 19 of the ring, said ring will be urged longitudinally of the shaft 10, whilst its other side face 20 becomes pressed against the surface of proximate wall 21 of the groove. The relationship between the ring surface 20 and groove surface 21 becomes so intimate under the influence of the high pressure of the lubricant that in prior art devices the fluid is excluded therefrom and lubrication of such surfaces is prevented, resulting in the creation of destructive friction.

In order to overcome the inherent conditions just mentioned, means are provided whereby the oil may be transmitted to the critical faces in question. Such means comprise a plurality of recesses or pockets 22 of thumb-nail shape that are formed in the surface 20 of the ring and are open through the lower edge thereof, to the space back of the inner face of the ring, as shown in Fig. 2. The bounding edge 23 of each recess or pocket is inscribed upon a volute curve, starting from the inner lower edge of the ring and curving forward and upward as at 24 to near the outer upper edge 17 and thence trailing rearward in a long sweeping arc 25. The depth of this recess or pocket is greatest near its leading forward arc 24, and this depth becomes shallower as it approaches the trailing sweep 25 until it finally merges into the side surface 20 of the ring at the arc 25. The disposition of the pocket is such that the edge 24 will face in the direction of rotation of the ring relative to its seat as indicated by the arrow.

The seal rings 16 are disposed, preferably an equal number on each side of the intermediate channel 14 in the manner shown in Fig. 1. When the pressure oil is forced into the channel through inlet port 13 the rings will be pushed thereby against the groove faces 21 that are remote to the channel, and the elasticity of the spring rings will urge their outer surfaces 17 against the internal surface 18 of the sleeve or bearing 11 as shown diagrammatically in Fig. 2. When thus positioned, the lubricant will enter the ring grooves 15 and pass through the spaces between the ring face 19 and the proximate groove wall and thence to the space between the inside faces 27 of the rings and the bottoms of the grooves. The pressure of the lubricant will force the oil into the recesses or pockets 22 on the critical sides of the rings to lubricate the ring faces 20 and the seat surfaces 21 that are contacted thereby, thus materially reducing wear on the surfaces in question. The progressive shallowness of the pockets 22 in the direction of arc 25 together with the wiping action of groove wall 21 results in a wedging of the lubricant between the ring and groove and thus insures the presence of lubricant at these points.

Although the number of such pockets 22 may vary in accordance with the pressures, materials and lubricant used, it has been found that three such pockets would be sufficient where the ring was made of cast iron and pressures of 100 pounds per square inch were used with a No. 10 S. A. E. oil.

While this invention has been described in detail in its present preferred form or embodiment, it will be apparent to persons skilled in the art, after understanding the improvements, that various changes and modifications may be made therein without departing from the spirit or scope thereof. It is aimed in the appended claims to cover all such changes and modifications.

I claim:

1. A lubricant sealing member comprising a spring ring having a flat face that is adapted to contact an opposing surface to be lubricated, a recess in said flat face of the ring and an entrance thereto leading from the inner circumference of said ring, so that lubricant may be provided over substantially the whole of the contacting surfaces when there is relative rotation between the ring and said opposing surface.

2. A lubricant sealing member comprising a spring ring having a flat face that is adapted to contact an opposing surface to be lubricated, and a recess in said flat face of the ring which extends radially outwardly from the inner circumference of the ring to a point adjacent its outer circumference, so that lubricant may be provided over substantially the whole of the contacting surfaces when there is relative rotation between the ring and said opposing surface.

3. A lubricant sealing member comprising a spring ring having a flat face that is adapted to contact an opposing surface to be lubricated, and a recess in said flat face extending radially outwardly from the inner circumference of the ring to a point adjacent its outer circumference and extending circumferentially, in the direction of movement of the opposing surface, from an arcuate leading region of maximum depth to a progressively shallower trailing region that merges into said flat face, the movement of the opposing surface past the recess thereby forcing the lubricant between the contacting surfaces by a wedging action.

4. In combination, means for supplying liquid under high pressure, a conduit for said liquid, said conduit including two telescoped members adapted for movement relative to each other, one of said members having an annular channel and a passageway in connection therewith for the passage of said liquid, the other of said members having a liquid conducting passageway operatively connected with said channel, and a seal for preventing loss of liquid from said conduit where said members are relatively movable, said seal comprising an annular groove in said one member and adjacent said channel, a spring ring in said groove with its radially outermost surface contacting said other member to form a seal therewith, the force exerted by said liquid under pressure positioning said ring against the side of the groove which is farthest from said channel, means for supplying liquid between said side of the groove and the adjacent face of the ring and comprising a recess in the face of the ring extending radially outwardly from the inner circumference of said ring to a point adjacent its outer circumference.

5. In combination, means for supplying liquid under high pressure, a conduit for said liquid, said conduit including two telescoped members, the inner member of said telescoped members being provided with an annular channel and a passageway in connection therewith for the passage of said liquid, the outer member having a liquid conducting passageway operatively connected with said channel, and a seal for preventing loss of liquid from said conduit where said members are relatively movable, said seal comprising an annular groove in the inner member adjacent said channel, a spring ring in said groove with its radially outermost surface contacting said outer member to form a seal therewith, the force exerted by said liquid under pressure positioning said ring against the side of the groove which is farthest from said channel, means for supplying liquid between said side of the groove and the adjacent face of the ring and comprising a recess in the face of the ring extending radially outwardly from the inner circumference of said ring to a point adjacent its outer circumference.

6. A lubricant seal comprising a pair of telescoped members adapted for movement relative to each other; one of said members being provided with an annular groove; a spring ring in said groove disposed with its outer surface contacting said other member to effect a lubricant seal therebetween; and a recess in a lateral face of said ring that is engaged with a surface of said groove to conduct lubricant to the contacting surfaces of the ring and groove, said recess extending radially outwardly from the inner circumference of the ring to a point adjacent its outer circumference and extending circumferentially from an arcuate leading region of maximum depth to a progressively shallower trailing region that merges into the lateral contacting surface of the ring, the relative movement of the contacting surfaces causing lubricant in said recess to be forced between said surfaces by a wedging action.

7. A lubricant sealing member comprising a spring ring having a flat face that is adapted to contact an opposing surface which is rotatable relative to said ring, and a lubricant carrying recess in said flat face extending radially outwardly from the inner circumference of the ring to a point adjacent its outer circumference and extending circumferentially from a region of maximum depth to a progressively shallower region that merges into said flat face, the relative movement between said opposing surface and said ring causing lubricant to be forced between the contacting surfaces by a wedging action.

GEORGE E. FLINN.